United States Patent
Shirai

(10) Patent No.: US 8,618,711 B2
(45) Date of Patent: Dec. 31, 2013

(54) THREE-PHASE DC MOTOR

(75) Inventor: Yasuyuki Shirai, Fuwa-gun (JP)

(73) Assignee: Nabtesco Corporation (JP)

( * ) Notice: Subject to any disclaimer, the term of this patent is extended or adjusted under 35 U.S.C. 154(b) by 56 days.

(21) Appl. No.: 13/352,700

(22) Filed: Jan. 18, 2012

(65) Prior Publication Data
US 2012/0187798 A1    Jul. 26, 2012

(30) Foreign Application Priority Data
Jan. 20, 2011  (JP) ................................ 2011-010036

(51) Int. Cl.
*H02K 1/00* (2006.01)
(52) U.S. Cl.
USPC ............................. 310/216.001; 310/216.109
(58) Field of Classification Search
USPC ......... 310/216.001, 216.109, 216.111, 254.1, 310/180
See application file for complete search history.

(56) References Cited

U.S. PATENT DOCUMENTS

| | | | | |
|---|---|---|---|---|
| 3,783,318 A | * | 1/1974 | Widstrand | ............. 310/216.014 |
| 5,811,907 A | * | 9/1998 | Fukuda et al. | ......... 310/216.073 |
| 7,714,474 B2 | * | 5/2010 | Yoshikawa et al. | .... 310/216.001 |
| 2006/0093694 A1 | | 5/2006 | Malwitz | |
| 2009/0134738 A1 | | 5/2009 | Yoshikawa et al. | |
| 2010/0133939 A1 | | 6/2010 | Takemoto et al. | |

FOREIGN PATENT DOCUMENTS

| | | |
|---|---|---|
| DE | 1964900 | 7/1971 |
| JP | 2010-142006 | 6/2010 |
| WO | 0062400 | 10/2000 |

* cited by examiner

*Primary Examiner* — Nguyen N Hanh
(74) *Attorney, Agent, or Firm* — Gerald E. Hespos; Michael J. Porco; Matthew T. Hespos

(57) ABSTRACT

A three-phase DC motor includes a rotor 30 having poles 30a and a stator 28 having core units 32b arranged around the rotor 30. Three or more coils are wound around the core units 32b. An outer surface of the rotor 30 has alternating poles of N and S around the circumference of the rotor 30. The coils 35a, 35b, 35c, and 35d are placed only within a range defined by second virtual planes P2 specified respectively by rotating a first virtual plane P1 according to a predetermined angle in a rotor rotating direction and a direction opposite thereto. The first virtual plane P1 passes through the axial center of the rotor 30. The inner surface of the adjacent 3N (N=1, 2, 3, ...) number of core units 32b are delimited within a width of one pole on the outer surface of the rotor 30.

7 Claims, 5 Drawing Sheets

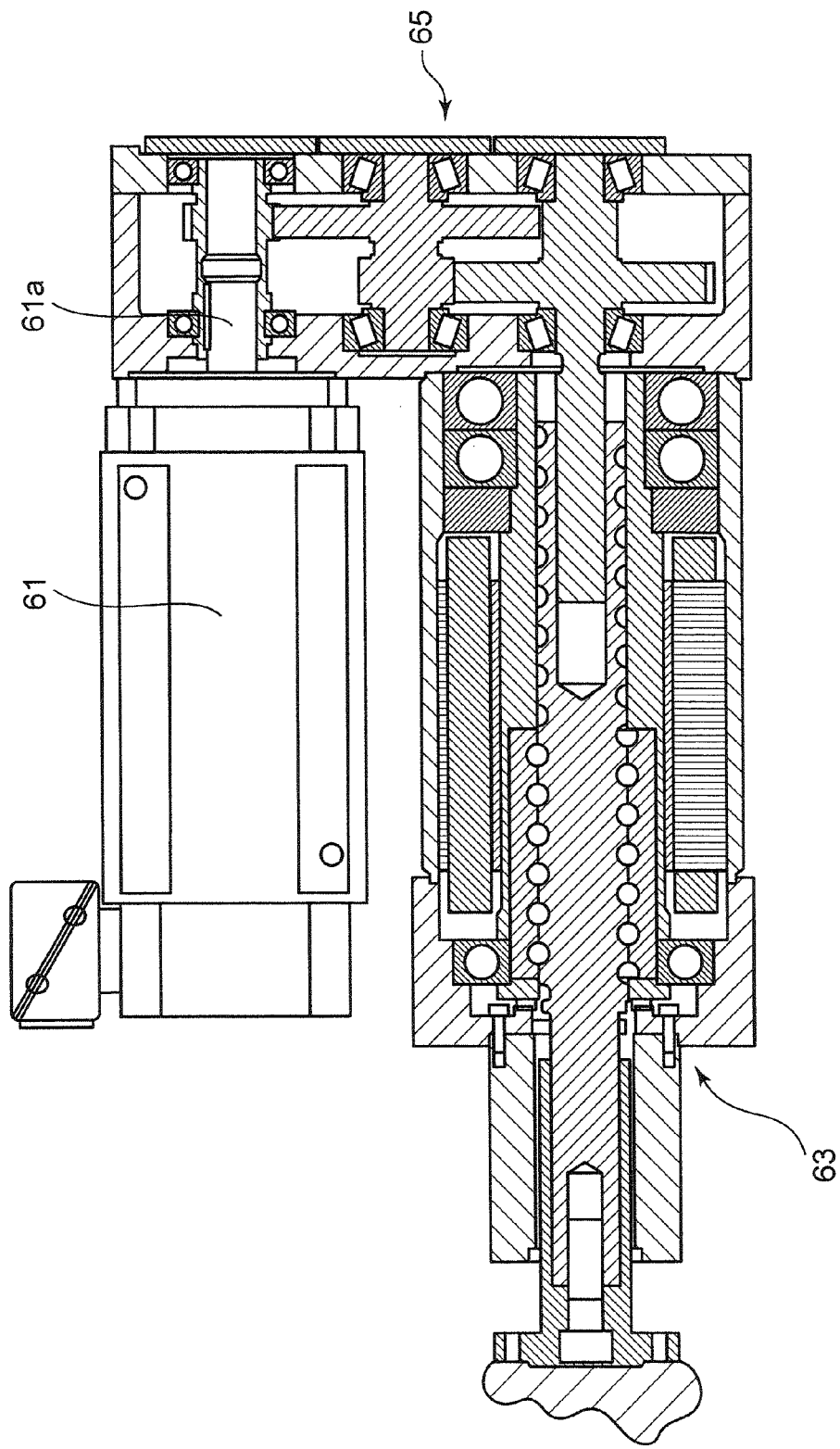

THREE-PHASE DC MOTOR

BACKGROUND OF THE INVENTION

1. Field of the Invention

The present invention relates to a three-phase DC motor.

2. Description of the Background Art

Conventionally, as disclosed in U.S. Patent Application Laid-Open No. 2006/0093694, motor-driven actuators are known. As shown in FIG. 7, the actuator disclosed in U.S. Patent Application Laid-Open No. 2006/0093694 has a ball-screw 63 horizontally mounted under a motor 61 with a drive shaft 61*a* thereof laid horizontally. The drive shaft 61*a* of the motor 61 and the ball-screw 63 are coupled to each other through a speed reduction mechanism 65. The ball-screw 63 rotates at a speed reduced at a predetermined rate relative to the rotation speed of the motor 61. Thus, the ball-screw 63 drives a driven unit or units. When the actuator is the one for driving a flight control surface of an aircraft, the driven unit is the flight control surface or a mechanism connected to the flight control surface.

Three-phase DC motors with an inner rotor is known as motors for driving an actuator, as disclosed in, for example, Japanese Patent Application Laid-Open No. 2010-142006. This three-phase DC motor has a rotor that is free to spin inside a stator's cylindrical hollow. The stator has inwardly projecting teeth spaced equally in the circumferential direction. A coil is wound around each of these core units (teeth). These coils are, U-phase coils, V-phase coils, and W-phase coils which are connected in series.

When the three-phase DC motor with an inner rotor as disclosed in Japanese Patent Application Laid-Open No. 2010-142006 is used for the actuator for driving a flight control surface of an aircraft, there is a limit to reduce the thickness of the wing in which the actuator is housed. More specifically, the stator of the motor has a cylindrical shape, so that the wing is required to have a thickness sufficient for the diameter of the stator to house the actuator. However, stators with a smaller diameter obviously produce smaller motor torque. In order to keep desired motor torque, reduction in thickness of the wing in which the actuator is housed has a limitation. One measure to address this problem is to use a number of small power motors and combine the outputs of these motors to achieve a desired output. This configuration requires to combine torque with some difficulties in mechanical and control considerations.

SUMMARY OF THE INVENTION

An object of the present invention is to provide a three-phase DC motor with which the aforementioned problems can be solved. In other words, an object of the present invention is to provide a three-phase DC motor which requires no combination of torque and contributes to reducing the thickness of wings of an aircraft.

A three-phase DC motor according to an aspect of the present invention comprises: a rotor having an outer surface and magnets; said outer surface of said rotor being configured to have alternating poles of N and S around a circumference of said rotor, a stator including a plurality of core units that are arranged around said rotor and having an inner surface opposite to said outer surface of said rotor; and three or more coils wound around said core units, said coils being placed only within a range defined by second virtual planes, said second virtual planes being specified respectively by rotating a first virtual plane according to a predetermined angle in a rotor rotating direction and a direction opposite thereto, said first virtual plane being a plane passing through the axial center of said rotor, inner surfaces of an adjacent 3N (N=1, 2, 3, . . . ) number of core units of said a plurality of core units being delimited within a width of one pole on said outer surface of said rotor.

BRIEF DESCRIPTION OF THE DRAWINGS

FIG. 7 is a cross-sectional view of a conventional actuator.

DETAILED DESCRIPTION OF THE PREFERRED EMBODIMENTS

Now, an embodiment of the present invention is described in detail with reference to the drawings.

A three-phase DC motor according to an embodiment of the present invention is a motor that serves as a driving source for a flight control surface actuator. This is an inner rotor type three-phase DC motor. The flight control surface actuator is installed in, for example, a wing of an aircraft and is used to swing movable flight control surfaces such as ailerons, elevators, and rudders.

Figure 1:
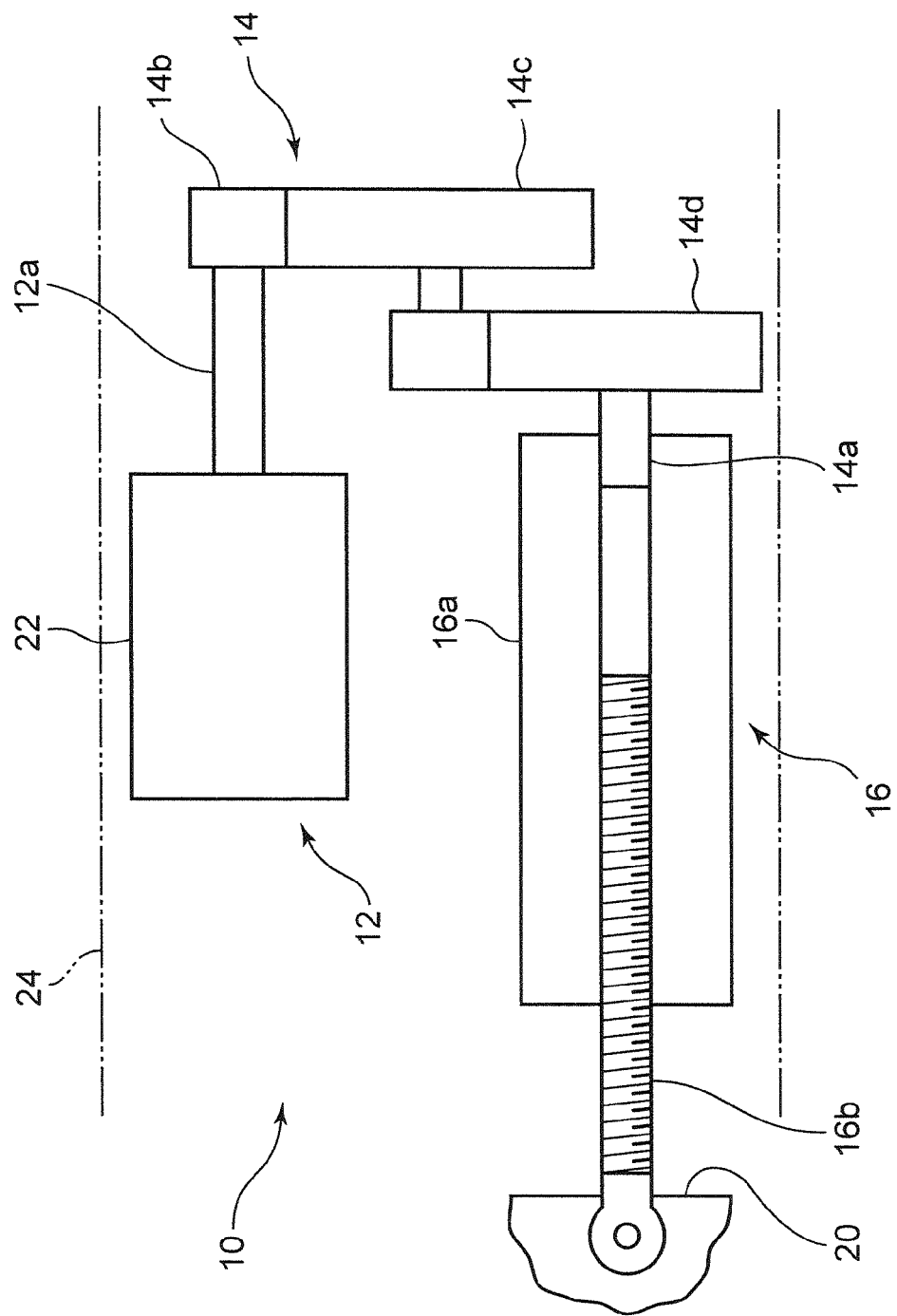
FIG. 1 is a schematic view showing a flight control surface actuator in which a three-phase DC motor according to an embodiment of the present invention is mounted.

As shown in FIG. 1, a flight control surface actuator 10 comprises a three-phase DC motor (hereinafter, referred to as a "drive motor 12") according to this embodiment, a speed reduction mechanism 14, and a linear motion mechanism 16. The speed reduction mechanism 14 reduces the rotational speed of a drive shaft 12*a* of the drive motor 12 at a constant rate. The linear motion mechanism 16 converts rotary motion (the speed of which is decreased by the speed reduction mechanism 14) into linear motion. The linear motion mechanism 16 uses, for example, a ball screw which comprises a nut 16*a* and a male threaded shaft 16*b*. The nut 16*a* is secured to a transmission shaft 14*a* of the speed reduction mechanism 14. The male threaded shaft 16*b* threadedly engages with the nut 16*a*. The nut 16*a* rotates along with the transmission shaft 14*a* of the speed reduction mechanism 14. The male threaded shaft 16*b* moves in a linear motion as the nut 16*a* rotates. An end of the male threaded shaft 16*b* is connected to a movable flight control surface 20 with a pin.

The speed reduction mechanism 14 includes a first reduction gear 14*c* and a second reduction gear 14*d*. The first reduction gear 14*c* reduces the rotation of a drive gear 14*b* secured to the drive shaft 12*a* of the drive motor 12. The second reduction gear 14*d* further reduces the rotation of the first reduction gear 14*c*. The transmission shaft 14*a* is projected from the second reduction gear 14*d*. The transmission shaft 14*a* is concentric with the rotation axis of the second reduction gear 14*d*.

Alternatively, the male threaded shaft 16*b* may be connected to the transmission shaft 14*a* with a pin while the nut 16*a* may be secured to the movable flight control surface 20. In this case, the rotation of the transmission shaft 14*a* brings about the rotation of the male threaded shaft 16*b*, leading linear motion of the nut 16*a* which is threadedly engaged with the male threaded shaft 16*b*.

The drive motor 12 has a motor body 22 and the drive shaft 12a extending from the motor body 22. The drive shaft 12a may be arranged in parallel with, for example, the male threaded shaft 16b of the linear motion mechanism 16. When the drive motor 12 is mounted within, for example, a horizontal tail 24, the drive shaft 12a may be arranged horizontally. The drive shaft 12a and the male threaded shaft 16b may be arranged along the same direction or in different directions, in perspective from the top.

Figure 2:
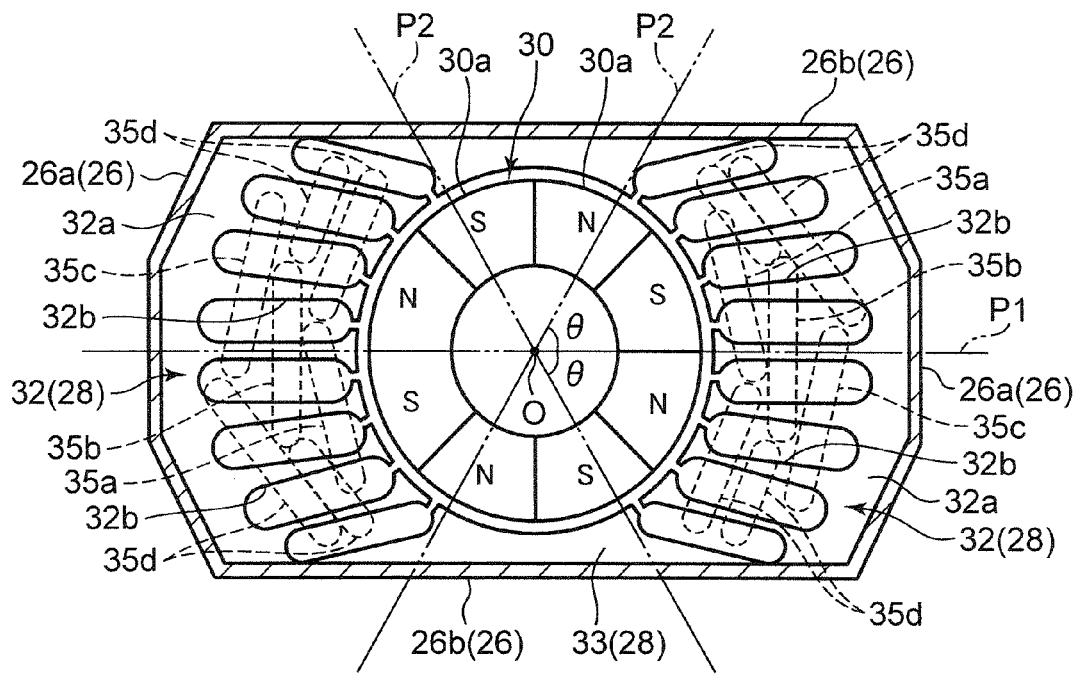
FIG. 2 is a schematic view of the three-phase DC motor.

FIG. 2 is a schematic view of the motor body 22 of the drive motor 12 as seen in the direction of the drive shaft 12a. The drive motor 12 shown in FIG. 2 has eight rotor poles as an example. As shown in FIG. 2, the motor body 22 comprises a casing 26 as well as a stator 28 and a rotor 30 which are housed in the casing 26.

The casing 26 has an oblong shape that is longer than it is wide in one direction (horizontal direction in FIG. 2) when viewed in cross section perpendicular to the shaft. The casing 26 comprises a pair of side segments at longitudinal extremities 26a positioned at the opposite longitudinal ends thereof, and a pair of parallel segments 26b connecting the side segments at longitudinal extremities 26a with each other. Each of the parallel segments 26b is formed to have a flat shape. The parallel segments 26b are arranged in parallel to each other and connected to the opposite ends (the upper and lower ends in FIG. 2) of the side segments at longitudinal extremities 26a. Thus, the distance between the parallel segments 26b is smaller than the distance between the side segments at longitudinal extremities 26a. When the drive shaft 12a is arranged horizontally as in the case of this embodiment, one parallel segment 26b forms the upper wall of the casing 26 and the other parallel segment 26b forms the bottom wall of the casing 26. Each of the side segments at longitudinal extremities 26a is not limited to a combination of multiple flat pieces connected to each other to form a single segment with internal angles as shown in FIG. 2. Alternatively, it may have a shape like an arc.

The stator 28 has a pair of stator units 32. The stator units 32 are arranged on both sides of the rotor 30. Each stator unit 32 is secured to either of inner walls of the side segments at longitudinal extremities 26a of the casing 26.

Figure 3:
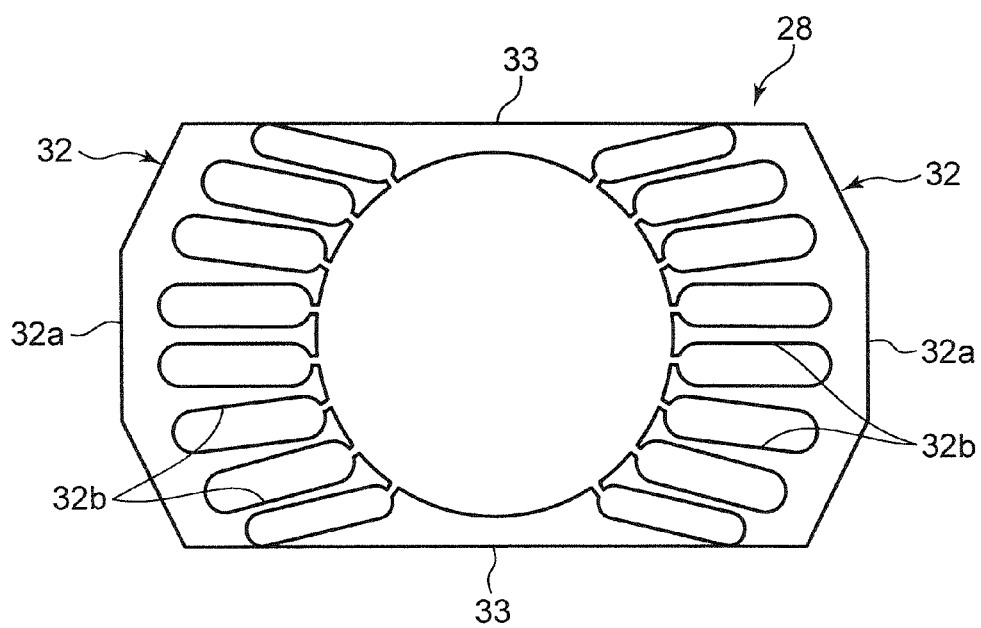
FIG. 3 is a view showing a stator provided in the three-phase DC motor.
Figure 4:
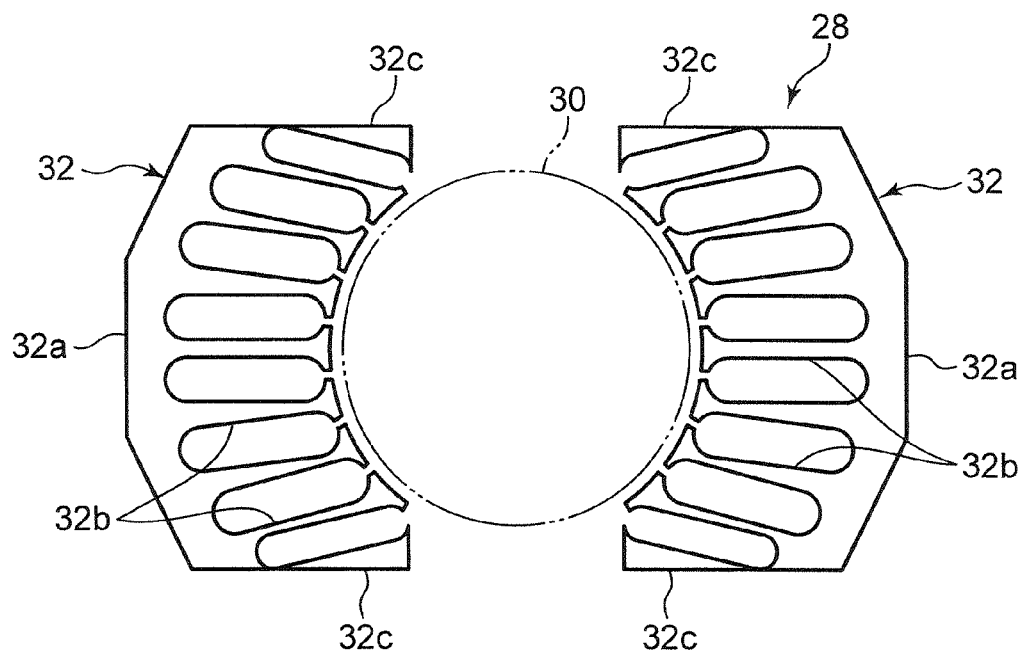
FIG. 4 is a view showing a variation of a stator.
Figure 5:
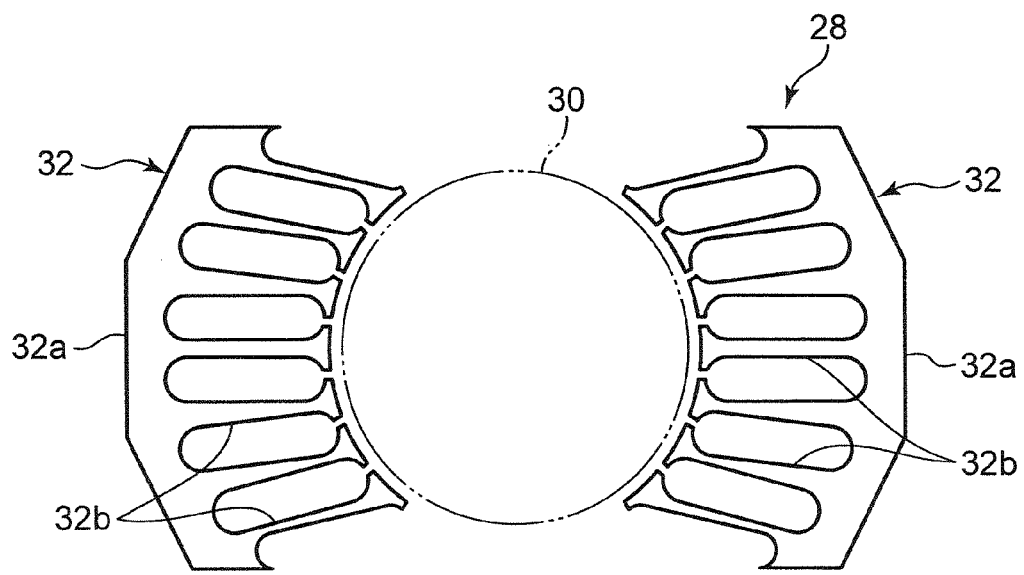
FIG. 5 is a view showing another variation of a stator.

The stator 28 is integrally formed. More specifically, as shown in FIG. 3, the stator 28 has a connecting unit 33 that is placed between the stator units 32, 32. The connecting unit 33 connects the stator units 32, 32 to integrally form the stator 28. As shown in FIG. 4 or FIG. 5, the connecting unit 33 may be omitted to provide the stator 28 with a pair of stator units 32 that are spaced apart from each other. Of these, the stator unit 32 shown in FIG. 4 has triangular units 32c each of which is generally triangular in shape. The triangular units 32c are secured to the casing 26 with a slot formed between the units 32c and their respective adjacent core units 32b. The stator units 32 shown in FIG. 5 have no triangular unit 32c.

The stator units 32, 32 have the same shape. Each stator unit 32 has a body unit 32a and a number of (seven in this embodiment) core units 32b. The body unit 32a contours with the inner surface of the side segment at longitudinal extremities 26a. The core unit 32b extends inwardly from the body unit 32a. The outer surface of the body unit 32a is joined to the inner surface of the side segment at longitudinal extremities 26a of the casing 26. Flat ends of the body unit 32a (the upper and lower end surfaces in FIG. 2) are joined to the inner surfaces of the parallel segments 26b, respectively, of the casing 26.

The entire inner surface of the body unit 32a contours the outer surface of the rotor 30. The core units 32b, ..., are integrally formed on this inner surface of the body unit 32a. The core units 32b, ... are spaced apart from each other at predetermined intervals. Each core unit 32b is oblong in the radial direction of the rotor 30 or in the direction slightly oblique to that direction.

The rotor 30 has a hollow cylindrical shape of a predetermined length in the axial direction of the drive shaft 12a. The rotor 30 has alternating poles 30a, ..., around its circumference. More specifically, the rotor 30 is magnetized with alternating poles 30a, ..., of the rotor 30 around its circumference on the radially outer surface thereof. Thus, the outer surface of the rotor 30 is magnetized with alternating N and S poles around its circumference. The "N" and "S" denotations in FIG. 2 indicate that the outer surface is magnetized with the N poles 30a and the S poles 30a. Thus, the radially inner surface of the magnetic poles 30a denoted by "N" is magnetized with the south pole while the radially inner surface of the magnetic poles 30a denoted by "S" is magnetized with the north pole. The rotor 30 may be integrally formed to have a hollow cylindrical shape so that it has alternating poles 30a, ..., around its circumference. Alternatively, a number of magnets may be assembled into a hollow cylinder. The magnets are not necessarily placed on the outer surface.

The core units 32b are placed so that they are opposite to a part of the circumferential span of the rotor 30. More specifically, the core units 32b are placed only within a range defined by two second virtual planes P2. These second virtual planes P2 are specified respectively by rotating a first virtual plane P1 according to a predetermined angle in the rotor rotating direction or the direction opposite thereto, the first virtual plane P1 being a plane passing through the axial center O of the rotor 30. Accordingly, no core unit 32b is placed in the region outside this range, i.e., a region within the predetermined angular range relative to the direction perpendicular to the first virtual plane P1. When the stator 28 have neither the connecting unit 33 nor the triangular units 32c (see FIG. 5), this region contains no parts of the stator 28. In cases where the core units 32b (coils) are placed only within the region that is formed when the rotor rotates at a predetermined angle around the axial center of the rotor, motor torque tends to be lower than a case where the coils are arranged along the entire circumference of the rotor 30. In order to compensate for this, the core unit 32b is elongated in the direction of the first virtual plane P1 to increase the number of winds of the coil.

The first virtual plane P1 is a plane parallel to the parallel segments 26b of the casing 26. The second virtual plane P2 is a plane that crosses the first virtual plane P1 at the axial center O of the rotor 30. The angle θ between the first virtual plane P1 and the second virtual plane P2 is not limited to a specific value, but is a value not larger than, for example, 70 degrees. The casing 26 has the shorter sides in the direction perpendicular to the first virtual plane P1 and the longer sides in the direction parallel to the first virtual plane P1.

In this embodiment, the outer surface of the rotor 30 has eight poles 30a. Each one pole 30a is opposed to three core units 32b. Each of the poles 30a is formed to be within a range formed when the rotor 30 rotates at an angle of 45 degrees around the axial center of the rotor 30. In the stator units 32, each of the core units 32b with the first virtual plane P1 being placed in the middle thereof can be opposed to one S pole and one N pole. Coils 35a, 35b, and 35c are wound around the five core units 32b (except for the outermost core units 32b) through which three phase currents (U-phase current, V-phase current, and W-phase current) are applied. In other words, the coils 35a, 35b, and 35c are placed within a range defined from the first virtual plane P1 to the two second virtual planes P2 which are specified by rotating through a predetermined angle in the forward and reverse direction of rotation of the rotor 30. Auxiliary coils 35d as described below are also placed within this range.

It should be noted that the rotor 30 is not limited to the one having eight poles 30a on the outer surface thereof. It may have even number of poles 30a, such as six, ten, or 12 poles in which the number herein is not smaller than 6. It is not limited that one pole 30a is opposed to the three core units 32b. Alternatively, one pole 30a may be opposed to a multiple of 3 core units 32b, i.e., 3N (N=1, 2, . . . ) core units 32b.

The coils arez the first coil 35a through which the first phase (e.g. U-phase) current flows, the second coil 35b through which the second phase (e.g., V-phase) current flows, and the third coil 35c through which the third phase (e.g., W-phase) current flows. Each of the first coil 35a, the second coil 35b, and the third coil 35c is wound around a bundle of the adjacent three core units 32b (corresponding to one pole) out of the six core units 32b. When the core units are increased (N is equal to or larger than 2), the coil is wound around a bundle of four or more core units. The first coil 35a, the second coil 35b, and the third coil 35c are offset in this order by the amount of one core unit 32b (⅓ pole pitch) in the direction of rotation of the rotor 30.

It should be noted that, in FIG. 2, the coils 35a, 35b, and 35c are illustrated as they are wound around a part of the core units 32b for the convenient purpose, but the coils 35a, 35b, and 35c are wound around the whole core units 32b.

The outermost core units 32b have no windings of the coils 35a, 35b, and 35c. Instead, the auxiliary coil 35d is wound around each of the outermost core units 32b.

Figure 6:
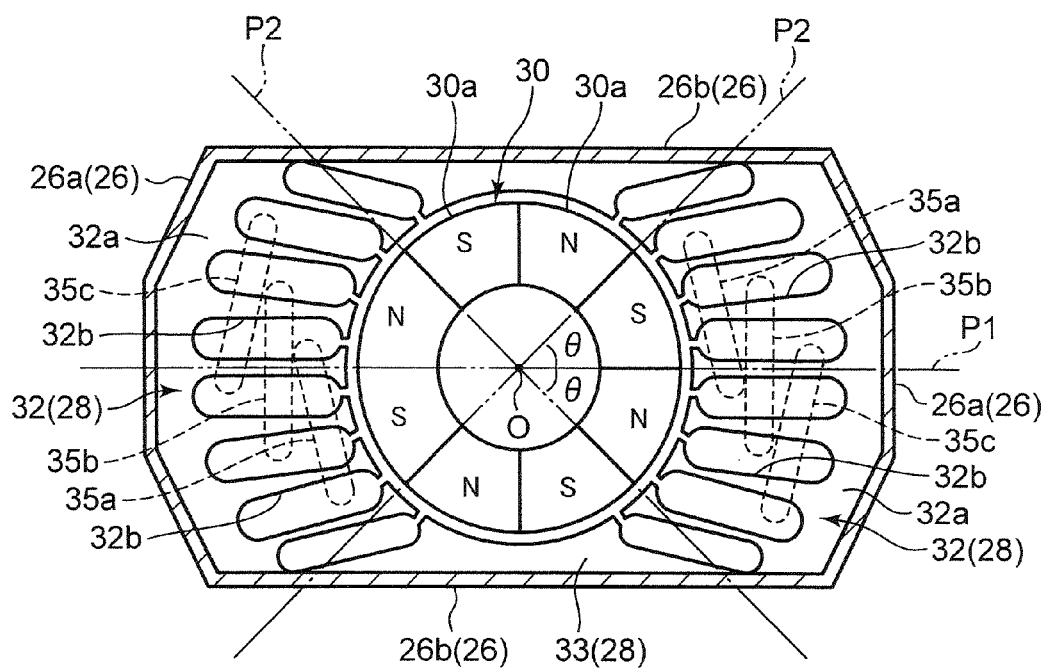
FIG. 6 is a schematic view of a three-phase DC motor according to an aspect where no auxiliary coil is used.

The auxiliary coils 35d are the coils other than the coils 35a, 35b, and 35c (a multiple of 3 coils). The auxiliary coils 35d are provided to achieve higher torque as compared with a case where only the coils 35a, 35b, and 35c are used. The auxiliary coil 35d is wound around a bundle of two or three (or not smaller than three or four when N is equal to or larger than 2) core units 32b including the outermost core units 32b. The auxiliary coils 35d illustrated at an upper portion in FIG. 2 are supplied with, for example, the V-phase and W-phase currents. The auxiliary coils 35d illustrated at a lower portion in FIG. 2 are supplied with, for example, the U-phase and V-phase currents. The auxiliary coils 35d contribute to increasing motor torque. If a thinner assembly is required, the outermost core units 32b at both ends in FIG. 2 may be omitted without using any auxiliary coil 35d. In addition, as shown in FIG. 6, the stator 28 in FIG. 1 may be used without the auxiliary coil 35d.

As described above, in the drive motor 12 according to this embodiment, the inner surface of the adjacent 3N number of core units 32b is delimited in the width of one pole 30a on the outer surface of the rotor 30. Accordingly, a magnetic effect between the stator 28 and the rotor 30 can be used as the driving force for the rotor 30 when each of the three-phase currents is applied to the coils 35a, 35b, and 35c to generate the magnetic flux around the coils 35a, 35b, and 35c. Furthermore, the stator units 32 having the coils 35a, 35b, 35c, and 35d are placed only within a range between the second virtual planes P2 which are specified by rotating the first virtual plane P1 through a predetermined angle in the forward and reverse direction of rotation of the rotor 30. Accordingly, the width of the stator 28 in the direction perpendicular to the first virtual plane P1 can be reduced as compared with a case where the stator units 32 as well as the coils 35a, 35b, and 35c are placed along the entire circumference of the rotor 30. As a result, it becomes possible to reduce the thickness of the three-phase DC motor. Thus, a desired output can be obtained without combining an output of another motor.

In addition, in this embodiment, so-called distributed winding is used in which the first coil 35a, the second coil 35b, and the third coil 35c are wound around the two or more core units 32b, 32b, . . . . This reduces torque ripple and allows relatively smooth driving without any special measure to the shape of teeth, the shape of the rotor, and a method of applying current. Accordingly, it is possible to reduce vibration and noise. Even with a high power motor, it is possible to reduce vibration and noise and improve reliability.

Moreover, in this embodiment, the auxiliary coil 35d is wound around the core units 32b placed at the outermost ends close to the second virtual planes P2 out of the core units 32b, 32b, . . . . This makes it possible to increase motor torque without enlarging the outer diameter of the stator 28.

Furthermore, in this embodiment, the stator 28 and the rotor 30 are housed in the thin casing 26. The parallel segments 26b of the casing 26 may be used as the surface used for installation, facilitating more stable installation of the motor.

It should be noted that the present invention is not limited to the embodiment, and various changes and modifications can be made without departing from the scope and spirit thereof In the embodiment, the linear motion mechanism 16 and the drive motor 12 are illustrated as being aligned on top of one another. However, this is not the only embodiment. For example, the drive motor 12 may be placed in the axial direction of the linear motion mechanism 16.

Now, the embodiment is summarized.

(1) In this embodiment, the inner surface of the adjacent 3N number of core units is delimited in the width of one pole on the rotor. Accordingly, a magnetic effect between the stator and the rotor can be used as the driving force for the rotor when each of the three-phase currents is applied to the coils to generate the magnetic flux around the coils Furthermore, the coils are placed only within a range between the second virtual planes which are specified by rotating the first virtual plane through a predetermined angle in the forward and reverse direction of rotation of the rotor. Accordingly, the width of the stator in the direction perpendicular to the first virtual plane can be reduced as compared with a case where the coils are placed along the entire circumference of the rotor. As a result, it becomes possible to reduce the thickness of the three-phase DC motor. Thus, a desired output can be obtained without combining an output of another motor.

(2) The three or more coils may include the first coil through which the first phase current flows, the second coil through which the second phase current flows, and the third coil through which the third phase current flows. In this case, the first coil, the second coil, and the third coil are each wound around a bundle of the adjacent core units. The first coil, the second coil, and the third coil may be offset in this order by ⅓ pole pitch in the direction of rotation of the rotor.

In this aspect, so-called distributed winding is used in which the first coil, the second coil, and the third coil are wound around the two or more core units. This reduces torque ripple and allows relatively smooth driving without any special measure to the shape of teeth, the shape of the rotor, and a method of applying current. Accordingly, it is possible to reduce vibration and noise. Even with a high power motor, it is possible to reduce vibration and noise and improve reliability.

(3) The auxiliary coil may be wound around at least core units placed at outermost ends on a side of the second virtual planes out of the core units.

In this aspect, it is possible to increase motor torque without enlarging the outer diameter of the stator.

(4) The three-phase DC motor may have the casing in which the stator and the rotor are housed. In this case, the casing may have sides shorter in the direction perpendicular to the first virtual plane than sides in the direction parallel to the first virtual plane. In this aspect, the stator and the rotor are housed in the thin casing.

(5) The three-phase DC motor may be configured as a driving source for the flight control surface actuator.

As described above, this embodiment can contribute to reducing the thickness of wings without combining torque with any other motor torque.

This application is based on Japanese Patent application No. 2011-010036 filed in Japan Patent Office on Jan. 20, 2011, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. A three-phase DC motor comprising:
a rotor having an outer surface and magnets, said outer surface of said rotor being configured to have alternating poles of N and S around a circumference of said rotor;
a stator including a plurality of core units that are arranged around said rotor and having an inner surface opposite to said outer surface of said rotor; and
three or more coils wound around said core units, said three or more coils including a first coil through which a first phase current flows, a second coil through which a second phase current flows, and a third coil through which a third phase current flows, said first coil, said second coil, and said third coil are each wound around a bundle of adjacent core units, and said first coil, said second coil, and said third coil are offset in this order by ⅓ pole pitch in the rotor rotating direction, said coils being placed only within a range defined by second virtual planes, said second virtual planes being specified respectively by rotating a first virtual plane according to a predetermined angle in a rotor rotating direction and a direction opposite thereto, said first virtual plane being a plane passing through the axial center of said rotor,
inner surfaces of an adjacent 3N (N=1, 2, 3, ... ) number of core units of said a plurality of said core units being delimited within a width of one pole on said outer surface of said rotor.

2. The three-phase DC motor as claimed in claim 1, wherein
an auxiliary coil is wound around at least core units placed at outermost ends on a side of said second virtual planes, out of said core units.

3. The three-phase DC motor as claimed in claim 1, further comprising a casing in which said stator and said rotor are housed, wherein
said casing has sides shorter in the direction perpendicular to said first virtual plane than sides in the direction parallel to said first virtual plane.

4. The three-phase DC motor as claimed in claim 1, wherein the three-phase DC motor is configured as a driving source for a flight control surface actuator.

5. A three-phase DC motor comprising:
a rotor having an outer surface and magnets, said outer surface of said rotor being configured to have alternating poles of N and S around a circumference of said rotor;
a stator including a plurality of core units that are arranged around said rotor and having an inner surface opposite to said outer surface of said rotor; and
three or more coils wound around said core units, said coils being placed only within a range defined by second virtual planes, said second virtual planes being specified respectively by rotating a first virtual plane according to a predetermined angle in a rotor rotating direction and a direction opposite thereto, said first virtual plane being a plane passing through the axial center of said rotor,
inner surfaces of an adjacent 3N (N=1, 2, 3, ... ) number of core units of said a plurality of said core units being delimited within a width of one pole on said outer surface of said rotor, wherein
an auxiliary coil is wound around at least core units placed at outermost ends on a side of said second virtual planes, out of said core units.

6. A three-phase DC motor comprising:
a rotor having an outer surface and magnets, said outer surface of said rotor being configured to have alternating poles of N and S around a circumference of said rotor;
a stator including a plurality of core units that are arranged around said rotor and having an inner surface opposite to said outer surface of said rotor; and
three or more coils wound around said core units, said coils being placed only within a range defined by second virtual planes, said second virtual planes being specified respectively by rotating a first virtual plane according to a predetermined angle in a rotor rotating direction and a direction opposite thereto, said first virtual plane being a plane passing through the axial center of said rotor, inner surfaces of an adjacent 3N (N=1, 2, 3, ... ) number of core units of said a plurality of said core units being delimited within a width of one pole on said outer surface of said rotor; and
a casing in which said stator and said rotor are housed, wherein
said casing has sides shorter in the direction perpendicular to said first virtual plane than sides in the direction parallel to said first virtual plane.

7. A three-phase DC motor comprising:
a rotor having an outer surface and magnets, said outer surface of said rotor being configured to have alternating poles of N and S around a circumference of said rotor;
a stator including a plurality of core units that are arranged around said rotor and having an inner surface opposite to said outer surface of said rotor;
a first coil through which a first phase current flows;
a second coil through which a second phase current flows; and
a third coil through which a third phase current flows;
said first coil, said second coil and said third coil being placed only within a range defined by second virtual planes, said second virtual planes being specified respectively by rotating a first virtual plane according to a predetermined angle in a rotor rotating direction and a direction opposite thereto, said first virtual plane being a plane passing through the axial center of said rotor,
inner surfaces of an adjacent 3N (N=1, 2, 3, ... ) number of core units of said a plurality of said core units being delimited within a width of one pole on said outer surface of said rotor,
said first coil, said second coil, and said third coil are each wound around a bundle of adjacent core units, and said first coil, said second coil, and said third coil are offset in this order by ⅓ pole pitch in the rotor rotating direction.

\* \* \* \* \*